United States Patent [19]
Cole et al.

[11] 3,860,531
[45] Jan. 14, 1974

[54] ALKYLATION AIDS

[75] Inventors: Edward L. Cole, Fishkill; Frederic C. McCoy, Beacon, both of N.Y.

[73] Assignee: Texaco Inc., New York, N.Y.

[22] Filed: June 18, 1973

[21] Appl. No.: 371,008

[52] U.S. Cl. ...... 252/426, 260/556 A, 260/556 AR, 260/683.63
[51] Int. Cl. ..... C07c 143/72, C07c 3/14, C07c 3/54
[58] Field of Search ... 252/426; 260/683.63, 556 A, 260/556 AR

[56] References Cited
UNITED STATES PATENTS

| | | | |
|---|---|---|---|
| 2,334,186 | 11/1943 | Fox | 260/556 A |
| 2,423,401 | 7/1947 | O'Kelly et al. | 260/683.63 X |
| 3,119,830 | 1/1964 | Burt et al. | 260/556 A X |
| 3,238,257 | 3/1966 | Ballard et al. | 260/556 A |
| 3,551,514 | 12/1970 | Evering | 260/683.63 X |
| 3,574,740 | 4/1971 | Martin | 260/556 A |

*Primary Examiner*—Paul F. Shaver
*Attorney, Agent, or Firm*—T. H. Whaley; C. G. Ries

[57] ABSTRACT

Methods for manufacturing sulfonamide alkylation aids as hydrocarbon solutions employing alkyl phenol solubilizing agents. Also, alkylation processes employing such alkylation aids.

9 Claims, No Drawings

ALKYLATION AIDS

This application is related to application Ser. No. 359,941, filed May 14, 1973 and to application Ser. No. 370,195, filed June 14, 1973 both of which are incorporated herein in their entirety for all purposes.

BACKGROUND OF THE INVENTION

The present invention relates to an improved process for manufacturing particular sulfonamides for use as alkylation aids in strong acid catalyzed alkylation reactions. More particularly, the process of the present invention produces such sulfonamide alkylation aids as components of a solution which may effectively be metered into an alkylation reaction.

Alkylation processes for reaction of alkylatable hydrocarbons with alkylating agents are well known and practiced widely upon a commercial basis. Commonly, an alkylatable hydrocarbon such as an isoparaffin or aromatic is reacted in the liquid phase with an olefin hydrocarbon in the presence of a heterogeneous, liquid-phase strong acid catalyst. Of particular commercial importance is the alkylation of low boiling isoparaffin hydrocarbons such as isobutane, isopentane, isohexane, etc. with low boiling olefin hydrocarbons such as propylene, butylenes, and isobutylenes, etc., to form high octane alkylate hydrocarbons suitable for use as gasoline blend stocks. The reactants may not be normally liquid, consequently, superatmospheric pressures are commonly employed to maintain reactants in the liquid phase. Reaction temperatures are preferably in the range of below 0° to 150°F. Strong acid catalysts, such as $H_2SO_4$, $HSO_3F$, HF, and mixtures of strong acids such as $H_2SO_4$-$SO_3$, $H_2SO_4$-$HSO_3F$, $H_2SO_4$-$HSO_3Cl$, and $H_2SO_4$-$HB(HSO_4)_4$ are employed and are brought into intimate contact with reactants by agitation or other mixing means. Under such reaction conditions, olefin hydrocarbons tend to react together forming polymer compounds as well as reacting with isoparaffin hydrocarbons to form the desired 1:1 isoparaffin-olefin products. Such olefin polymer by-products also tend to crack in the presence of the strong acid catalyst thus forming undesirable low octane light alkylate as well as equally undesirable high molecular weight heavy alkylate compounds. Additionally, olefin polymers are difficult to separate from the strong acid catalyst and form acid-oil sludges therein. The presence of such acid-oil sludges as well as water in the strong acid catalyst decreases the strength of the strong acid catalyst. Such decreased acid catalyst strength contributes to an increase in undesirable side reactions, such as olefin polymerization as well as decreasing the effectiveness of the acid catalyst for alkylation of isoparaffin with olefins. Desirably, the alkylate product comprises a major portion of the highly branched isomers of the 1:1 isoparaffin-olefin reaction product. For example, in the alkylation of isobutane with butene, trimethylpentanes are the desired product, and in the alkylation of isobutane with propylene, dimethylpentanes are the desired product. Low catalyst acidity due to the presence of acid-oil sludges and water contributes to production of less highly branched alkylate isomers which have lower octane values than more highly branched isomers, and consequently are of less value in gasoline blending. Additionally, cracked olefin polymers contribute substantial amounts of undesirable light and heavy alkylate compounds which have substantially lower octane values than the highly branched 1:1 isoparaffin-olefin adducts.

It is known that surface active compounds may be employed in admixture with the acid catalyst in an alkylation process to improve the production of highly branched 1:1 isoparaffin-olefin adducts at the expense of olefin polymers and the resulting light and heavy alkylate compounds. Also, the use of the surface active agents decreases the consumption of acid catalyst in an alkylation process. For example, reference may be made to the following U.S. Patents which describe a variety of surface active compounds which may be used in alkylation processes described herein. Reference U.S. Pat. Nos. are: 2,880,255; 3,551,514; 2,981,772; 3,231,633; 3,364,280; and 3,324,196. Such surface active agents, disclosed in the preceding patents, are effective for reducing the surface tension of the strong acid catalyst thereby improving contact of the catalyst with reactant hydrocarbons. It is also postulated that perhaps these surface active agents may serve to increase solubility of reactant hydrocarbons within the liquid catalyst phase. As a consequence, such surface active agents must be used with care since relatively small amounts of such surface active agents tend to create stable emulsions of reactant hydrocarbon and acid catalyst under the conditions of agitation and mixing commonly employed in commercial alkylation reactions. Such reactant acid emulsions are difficult to break thus complicating separation of acid catalyst from hydrocarbon effluent of an alkylation process.

As disclosed in copending applications Ser. No. 359,941, filed May 14, 1973, and Ser. No. 370,195, filed June 14, 1973, which are incorporated herein by reference in their entirety, we have discovered particular sulfonamides and solutions containing such sulfonamides which improve alkylate quality and reduce acid catalyst consumption when added in small quantities to strong acid catalyzed alkylation reactions. The particular sulfonamides useful as alkylation aids have the following chemical formula:

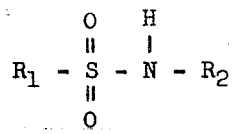

wherein $R_1$ is selected from alkyl, aromatic and alkyl aromatic, and wherein $R_2$ is selected from alkyls having from about 8 to 30 carbon atoms.

These particular sulfonamides are solids at room temperature, and are only slightly soluble (less than 1 percent in gasoline range hydrocarbons such as cyclohexane, alkylate, etc., at ambient temperatures).

In solid form, metering of the sulfonamides into a closed alkylation reaction system presents mechanical difficulties, and unduly large volumes of dilute solutions of sulfonamide in hydrocarbon are required to obtain a desired concentration of sulfonamide in the reaction system. The sulfonamides are soluble in liquid acids, such as $H_2SO_4$. However, the acid solutions are extremely corrosive and require special pumping and metering equipment. Also, such concentrated acid solutions present considerable safety hazards to personnel who prepare and handle them. Accordingly, application Ser. No. 370,195, filed June 14, 1973 discloses that the sulfonamides may be dissolved in gasoline range hydrocarbons by using an alkyl phenol solubilizing agent, thereby forming solutions containing from about 5 to 15 percent of the sulfonamides. Such solutions of the sulfonamides in hydrocarbon liquids wherein alkyl phenols are used as solubilizing agents are convenient to meter into alkylation reaction systems and do not present the hazards associated with strong acid solutions.

SUMMARY OF THE INVENTION

Now, according to the present invention, we have discovered an improved method for manufacturing solutions of the particular sulfonamides useful as alkylation aids which have the following chemical formula:

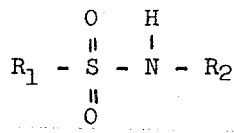

wherein $R_1$ is selected from alkyl, aromatic, and alkyl aromatic, and wherein $R_2$ is alkyl having from about 8 to 30 carbon atoms.

By following the method of the present invention, the sulfonamides are manfactured as solutions in hydrocarbon liquids, wherein alkyl phenols are present as solubilizing agents. The sulfonamides so produced are in a form convenient for ready use in alkylation reaction systems. Additionally, by incorporating alkyl phenols as solvent medium, the process steps required to produce the sulfonamides in a readily usable form are significantly reduced over the previous methods wherein the sulfonamides were produced as solids and were subsequently dissolved in a separate process sequence.

DETAILED DESCRIPTION OF THE INVENTION

Surprisingly, it has been found that certain sulfonamides represented by the formula

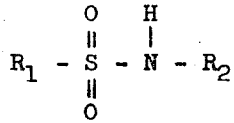

wherein $R_1$ is alkyl, aryl, or alkyl aromatic, and wherein $R_2$ is alkyl of from 8 to 30 carbon atoms, have properties such that, when added to an alkylation reaction mixture, increased yields of high quality products and lower consumption of alkylation catalyst are experienced. The mechanism by which these desirable results are obtained is not understood. The prior art teaches that in alkylation reactions wherein the reactants form a heterogeneous liquid phase with a liquid alkylation catalyst, the amount of common surface presented by the two phases contributes to determination of the alkylation reaction rate and quality of products formed in the reaction. Consequently, it is common practice for increasing the surface area, to subject an alkylation reaction mixture to severe agitation to form an emulsion. It is also taught in the prior art to employ surface active agents for decreasing the surface tension between reactant phase and catalyst phase such that emulsions with increased surface may be developed. However, compounds closely related to compounds of the present invention and which have surface active properties, such as N,N' - (di-2-ethylhexyl) benzene sulfonamide, do not improve alkylation reactions in the manner of the compounds of the present invention.

Compounds of the present invention useful as promoters of alkylation reactions are sulfonamides having a relatively long chain alkyl radical attached to the nitrogen of the sulfonamide. Such alkyl radicals may have from 8 to 30 carbon atoms and may be either straight or branched chain. Preferably, the alkyl radical is from 10 to 18 carbon atoms in length and particularly preferred is a straight chain alkyl radical of 18 carbon atoms (the octadecyl radical). In addition to the alkyl radical attached to the nitrogen, a hydrocarbon radical is also attached to the sulfur atom. Such hydrocarbon radicals may comprise alkyl, aromatic, or alkyl-aromatic. Hydrocarbon radicals of from about 1 to 7 carbon atoms are preferred with the methyl, phenyl, and tolyl radicals being particularly preferred. The phenyl radical is of highest preference as the hydrocarbon radical attached to the sulfur atom of the sulfonamides. The sulfonamides disclosed herein may be used as pure compounds or as mixtures of such compounds for achieving the beneficial effects of increased yields, higher quality alkylate products, and lower alkylation catalyst consumption. Sulfonamide compounds which are particularly useful in the practice of the present invention include N-(octadecyl) benzene sulfonamide, N-(octadecyl) toluene sulfonamide, N-(octadecyl) methane sulfonamide, N—($C_{10}$-$C_{14}$ alkyl) benzene sulfonamide, and N—($C_{14}$-$C_{15}$ alkyl) benzene sulfonamide. The amount of sulfonamide compounds of the present invention which are employed in an alkylation reaction may be varied from about 0.0005 to about 0.5 weight percent of the catalyst employed. At concentrations below about 0.0005 percent, the benefits obtained from such sulfonamides is not substantial. At concentrations above about 0.5 weight percent, surface active characteristics of the sulfonamides become prevalent and emulsions of hydrocarbon reactant and catalyst phase may become difficult to separate.

The present invention is applicable to alkylation reactions, that is reaction of an alkylatable hydrocarbon with an alkylation agent. Alkylatable hydrocarbons include isoparaffin hydrocarbons, aromatic hydrocarbons, etc. Alkylating agents include compounds such as olefins, alcohols, alkyl esters, ethers, alkyl sulfates, and others capable of contributing an alkyl radical to form a 1:1 reaction product with an alkylatable hydrocarbon under alkylation reaction conditions. Particularly, the present invention is applicable to those alkylation reactions wherein relatively low molecular weight alkylatable hydrocarbons are reacted with alkylating agents to form alkylate hydrocarbons boiling in the gasoline range. More particularly, the present invention is applicable to alkylation of isoparaffin hydrocarbons of from 4 to 6 carbon atoms, and preferably isobutane, with olefin hydrocarbons of from 3 to 5 carbon atoms, preferably propylene, butylenes, or mixtures thereof.

Olefin hydrocarbons are highly reactive under alkylation conditions and sufficient alkylatable hydrocarbon is provided to react with essentially all the olefins present. Preferably, a substantial excess of alkylatable hydrocarbons is provided to ensure more complete reaction of olefins with the alkylatable hydrocarbons. Molar ratios of isoparaffin to olefin may range from about 1/1 to about 50/1, and molar ratios of about 5/1 to about 20/1 are preferred. In such alkylation processes, reactants are maintained in the liquid phase. Reactants are not necessarily normally liquid, and superatmospheric reaction pressures are employed to maintain reactants in the liquid phase. Reaction pressures of from about 10 to 150 psig are preferred, although higher and lower pressures may be used without adverse effect so long as reactants remain in the liquid phase.

Catalysts for alkylation reactions include strong acids such as HF, $H_2SO_4$, the systems $H_2SO_4$—$SO_3$, $H_2SO_4$—$HSO_3F$, $H_2SO_4$—$HSO_3Cl$, $H_2SO_4$—$HB(HSO_4)_4$, and other strong Bronsted and Lewis acids. Acid catalysts which form heterogeneous liquid phases in the presence of liquid reactants are contemplated herein. While various acid catalysts can be used, strong acid catalysts comprising about 88–98 weight percent $H_2SO_4$ are particularly preferred. When such sulfuric acid catalyst is used, reaction temperatures may range from below 0° to 150°F. At lower temperatures, reaction rates are slower including side reaction rates which contribute undesirable side products, and at higher temperatures reaction rates increase, particularly the undesirable self-polymerization of olefins. Preferred reaction temperatures for alkylation reactions of isoparaffins with olefins in the presence of sulfuric acid catalyst are in the range of 0°-100°F. and especially preferred are temperatures in the range of 20°-75°F.

Olefin hydrocarbons, in the presence of acid catalysts, tend to self-polmerize into relatively high molecular weight polymers. The polymers then tend to crack into lower molecular weight hydrocarbons. The polymers and cracked hydrocarbons represent lost yield of desired alkylate product. Also in isoparaffin-olefin alkylation reactions for production of high octane alkylate, olefin polymers and cracked hydrocarbons are particularly undesirable as they are low octane value and possess a substantial degree of unsaturation. Olefin polymers are difficult to separate from liquid strong acid alkylation catalyst, thus contributing to a decrease in acid strength of such catalyst. Decreased acid strength adversely effects the alkylation reaction, lowering the alkylation reaction rate and increasing formation of less desirable alkylate isomers. Also, reactions occur with the acid to form acid-oils. Consequently, acid is consumed in alkylation reactions in which polymerization and cracking occur as side reactions. In commercial practice, a portion of used catalyst is withdrawn from the alkylation system and replaced with fresh concentrated acid in order to maintain alkylation catalyst at a selected acid concentration. The withdrawn acid, known as spent acid, must then be regenerated or disposed of at considerable expense.

Commonly, commercial alkylation processes are continuous flow operations, although batch operations may also be performed. In a continuous flow process, reactant hydrocarbons and acid catalyst are contacted with agitation in a reaction zone. Reaction zone effluent is separated into a hydrocarbon phase and an acid phase with a portion of the separated acid phase being recycled for contact with additional reactants. If desired, a plurality of alkylation zones may be arranged to receive serial flow of acid phase and/or reactant phase. The isoparaffin is preferably present in substantial excess to olefin reactant, and an isoparaffin stream may be introduced into an alkylation reaction zone for contact with the acid catalyst. The olefin may then be introduced as a liquid or as a gas, and may enter the reaction zone with the isoparaffin, the acid, or may be introduced separately into the reaction mixture present in the reaction zone. The reaction effluent hydrocarbon phase comprises isoparaffin hydrocarbon and contains a substantial amount of alkylate hydrocarbon product. The alkylate hydrocarbon is separated from the isoparaffin in an alkylate recovery section, which may comprise one or more fractional distillation zones and/or other separation means. Preferably, in a commercial process, isoparaffin hydrocarbon separated from the reaction effluent is recycled as reactant to an alkylation reaction zone.

The use of the particular sulfonamides disclosed in the present application as catalyst aids, particularly in sulfuric acid catalyzed alkylation of isoparaffins with olefins improves yield and quality of product alkylate. The alkylation reaction is promoted, thus additional amounts of 1:1 isoparaffin-olefin reaction product are produced and, concomitantly, less olefin polymer and resulting cracked products are produced. Additionally, the formation of highly branched alkylate hydrocarbons is favored over their less highly branched isomers. In production of gasoline range alkylate, the highly branched isomers are preferred since octane number increases with increased branching. With the reduction in polymer and cracked hydrocarbon formation, acid consumption is also substantially decreased.

Such particular sulfonamide alkylation aids are conveniently employed in the form of solutions in hydrocarbon solvents wherein alkyl phenols are used as solubilizing agents. Preferably the sulfonamide alkylation aids comprise from about 5 to 15 percent of such solutions. The solvents which may be used in making such solutions of the sulfonamide alkylation aids are those hydrocarbons boiling generally within the gasoline boiling range, e.g., about 35°–220°C. Preferred solvents include cycloalkanes, particularly cyclohexane; alkyl substituted cycloalkanes, particularly methylcyclohexane; polycycloalkanes, particularly decalin; and paraffins, particularly $C_6$ through $C_{10}$ aliphatics. Less preferred are low boiling aromatics such as toluene and benzene. Conveniently, alkylate product of the alkylation reaction may be employed as solvent.

The particular sulfonamide alkylation aids described herein are only slightly soluble in hydrocarbon solvents, and the alkyl phenol solubilizing agents are required to form solutions containing substantial sulfonamide concentrations. Such alkyl phenols are generally employed in a weight ratio to sulfonamide of from about 1:1 to about 10:1. Increasing the amount of alkyl phenol in a particular solution lowers the temperature at which solids begin to separate from the solution. Also, increasing the amount of hydrocarbon, e.g., decreasing percent sulfonamide, at a selected alkyl phenol-to-sulfonamide ratio results in improved resistance to crystal separation on standing. Preferably, the solutions are stable over the expected range of ambient temperatures to which the solutions will be exposed. In order to remain liquid over normal ambient temperature ranges, the hydrocarbon solvent component comprises from about 40 percent to about 90 percent of the solution. At a selected sulfonamide concentration, the proportions of alkyl phenol solution aid and hydrocarbon solvent are adjusted to obtain the desired range of temperature stability. The particular hydrocarbon solvent employed, and to a lesser extent the alkyl phenol solution aid employed, affect the range of temperature stability of the solutions prepared. Some experimentation, which is within the skill of the art, may be necessary in selecting the exact proportions of components in such a solution of sulfonamide alkylation aid to obtain the desired range of temperature stability.

According to the present invention, the sulfonamide alkylation aids described herein are manufactured in a process wherein a sulfonyl chloride, such as benzene sulfonyl chloride is reacted with an alkyl amine and aqueous sodium hydroxide in the presence of a hydrocarbon diluent. In the process, an alkyl phenol solubilizing agent is introduced into the reaction mixture and the sulfonamide reaction product is recovered in a hydrocarbon-alkyl phenol solution. The alkyl phenol imparts temperature stability to the solution such that the sulfonamide does not precipitate or crystalize as the solution is cooled to ambient conditions.

Alkyl amines which may be used in the present invention are primary alkyl amines wherein the alkyl radical contains from 8 to 30 carbon atoms. Octadecyl amine is preferred. Sulfonyl chlorides which are within the contemplation of the present invention are those containing a hydrocarbon radical selected from alkyl, aromatic and alkyl aromatic. Particularly useful sulfonyl chlorides are benzene sulfonyl chloride, toluene sulfonyl chloride and methane sulfonyl chloride. Benzene sulfonyl chloride is most preferred. Hydrocarbon solvents which may be used include cycloalkanes, particularly cyclohexane; polycycloalkanes, particularly decalin; paraffins, particularly $C_6$ through $C_{10}$ aliphatics; low boiling aromatics, such as toluene and benzene. When conveniently available, it may be desirable to employ an alkylate hydrocarbon product boiling in the gasoline range as hydrocarbon solvent in the process of the present invention.

Alkyl phenol solution aids which may be used in the process of the present invention include mono- and dinuclear aromatics containing at least one phenolic hydroxyl group and at least one alkyl side chain having from 6 to 50 carbon atoms. Preferably, mononuclear phenols having a branched side chain of from 9 to 15 carbon atoms are employed as solubilizing agents in the present invention.

In a preferred reaction sequence, alkyl amine is slurried with hydrocarbon solvent, wherein the hydrocarbon solvent is also to be the solvent for the product sulfonamide solution. The weight ratio of hydrocarbon solvent to alkyl amine in the slurry may be from about 5:1 to about 50:1. At ratios below about 5:1, insufficient hydrocarbon is available to form the desired solution of product sulfonamide alkylation aid, and at ratios above about 50:1, the resulting sulfonamide product solutions may be too dilute unless substantial quantities of hydrocarbon solvent are removed by such means as distillation. The alkyl amine-hydrocarbon solvent slurry may be prepared in a vessel at about atmospheric pressure and room temperature. To this slurry, a solution of sodium hydroxide in water is added with stirring. Preferably, the sodium hydroxide solution comprises from about 2 weight percent to about 10 weight percent sodium hydroxide. The amount of sodium hydroxide added is preferably in slight stoichiometric excess, e.g., 5–10 percent, over the amount theoretically required for the reaction which follows. The alkyl amine-hydrocarbon slurry and the sodium hydroxide solution are intimately mixed under conditions of continuous stirring, and this mixture is heated to a temperature in the range of about 35°C. to about 70°C. preferably 50°C. to 60°C. Such temperature selected is below the boiling point of the hydrocarbon solvent employed and is high enough to achieve a substantially complete solution of the amine. A selected sulfonyl chloride, containing the hydrocarbon radical desired in the product sulfonamide, is added to the heated mixture under conditions of continuous stirring, and preferably with cooling, at a rate such that the temperature of the reaction mixture does not exceed either about 75°C. or the boiling point of the hydrocarbon solvent. After addition of the sulfonyl chloride is complete, the mixture is maintained at a temperature of from about 50°C. to about 75°C. under conditions of continuous mixing for a time to insure completion of the chemical reaction. The time required for complete reaction will vary considerably depending upon the degree of mixing, the reaction temperature, and other physical conditions to which the reaction mixture is subjected. Reaction times of from a few minutes to several hours may be required. However, reaction times of 3 to 4 hours are apparently sufficient for essentially complete chemical reaction when the reaction mixture is continuously stirred and the reaction temperature is in the range of about 50°–75°C. The major chemical reactions which occur are reaction of sulfonyl chloride, alkyl amine and sodium hydroxide to yield sulfonamide product, water, and sodium chloride.

At the reaction temperatures employed, sulfonamide product is hydrocarbon-soluble and sodium chloride is water-soluble. Thus, upon completion of the reaction period, the reaction mixture is separated into a hydrocarbon phase containing sulfonamide product and a water phase containing sodium chloride and any unreacted sodium hydroxide. Liquid-liquid separation means are employed to separate the phases. For example, the reaction mixture may be allowed to settle, preferably with cooling to about room temperature, whereupon a hydrocarbon phase separates from a water phase. These phases may then be separated by decantation, etc.

The separated hydrocarbon phase contains some dispersed water and sodium chloride which are deleterious materials in an alkylation reaction for which the sulfonamide products are intended as alkylation aids. Thus, it is desirable to remove these impurities from the hydrocarbon phase. Conveniently the water may be removed by distillation. With many of the hydrocarbon solvents employed, water forms a low-boiling azetrope, thus distillation may be effected at temperatures of about 100°C. and lower at atmospheric pressure. Atmospheric pressure is preferred as the cost of distillation equipment is substantially less for atmospheric pressure distillation processes. Distillation of water from the hydrocarbon phase is continued until essentially all the water is removed overhead.

Alkyl phenol solubilizing agent is now added to the dry hydrocarbon-sulfonamide solution with mixing at a temperature above about 40°C. to form a clear solution. Distillation may then be continued, if desired, to adjust the proportion of hydrocarbon solvent in the product solution.

A small amount of solid sodium chloride may precipitate upon distillation of the water from the hydrocarbon phase. Thus, solids are removed from the product solution by solid-liquid separation means, such as settling, filtration, etc. Preferably, the hot solution comprising sulfonamide, alkyl phenol and hydrocarbon solvent is filtered for removal of solids upon discharge from the distillation step. The filtered solution of sulfonamide, alkyl phenol, and hydrocarbon solvent is a liquid product suitable for use as an alkylation aid in an alkylation reaction. The solution may conveniently be transported as a liquid from the manufacturing facility to its point of use in an alkylation process, and may be accurately metered into the alkylation process to maintain the desired concentration of sulfonamide alkylation aid in the alkylation reaction.

The following examples are included to more clearly demonstrate the process of the present invention. The following examples, disclosing specific embodiments of the present invention, are for the purpose of demonstration only. These examples are not presented in a limiting sense and are not intended to restrict the scope of the present invention.

EXAMPLE I

Into a 3-neck flask, equipped with a stirrer, the following reactants were charged:
34 g. (0.12 mol.) octadecylamine
357 g. cyclohexane
6.5 g. (0.132 mol.) NaOH dissolved in 100 ml.H$_2$O
The NaOH was present in 10 percent stoichiometric excess. Contents of the flask were heated with stirring to 55°C. and 28.2 g. (0.15 mol.) of 94 percent benzene sulfonyl chloride were added over a 15 minute period. The temperature of reactants in the flask rose to 69°C. Upon addition of the benzene sulfonyl chloride, the contents of the flask were heated at reflux (71°C.) for 3 hours. The flask contents were cooled and allowed to settle, forming two liquid layers. Fifty ml. of a water layer containing dissolved NaCl reaction product was drawn off the flask. The remaining liquid in the flask was distilled to remove remaining water as a cyclohexane-water azeotrope. Upon cooling the dry, liquid contents of the flask, 153 g. of dodecyl phenol were added and the mixture was heated to 60°C. until all organic material was dissolved. The hot (60°C.) contents of the flask were filtered to remove any solid NaCl. From this process, 540 g. of product were recovered, containing approximately 9 percent N-(octadecyl) benzene sulfonamide. No appreciable crystal formation was observed in the product solution after standing 3 weeks at 25°C.

EXAMPLE II

Three hundred twenty-two liters of stabilized alkylate together with 8.3 kilograms of octadecylamine are slurried in a glass-lined reactor vessel equipped with heating and cooling coils. To the slurry, 1.32 kilograms of NaOH, as a 5 percent water solution, is added with stirring and the mixture is heated to 55°C. To the hot mixture 3.5 kilograms of methane sulfonyl chloride is added, with stirring, over a 30 minute period. The temperature is not allowed to exceed 75°C. by use of cooling water in the cooling coils during the period of methane sulfonyl chloride addition. Stirring is continued for 400 minutes at a temperature of about 70°C. The stirring is then discontinued and the reactor contents are allowed to settle for 30 minutes and form two liquid layers. The water layer, containing dissolved NaCl is drawn-off the reactor vessel and the hydrocarbon layer is charged to a distillation column. In the distillation column, the hydrocarbon layer is distilled to recover the remaining water overhead. About 19 liters of alkylate-water mixture is recovered overhead. Thirty-one and eight-tenths kilograms of nonyl phenol is added to the tower, and an additional 71 liters of alkylate is distilled overhead. Effluent from the distillation column bottoms is filtered at about 35°C. to remove a small amount of solid NaCl, The final composition of the filtered solution is:
5.1% (10.4 kg.) N-(octadecyl) methane sulfonamide
15.6% (31.8 kg.) Nonyl phenol
79.3% (161.8 kg.) Alkylate
This solution is clear at about 38°C., and becomes cloudy when cooled below about 35°C.

We claim:
1. A process for manufacturing a liquid solution useful as an alkylation aid comprising:
   a. combining, in a reaction zone, primary alkylamine having an alkyl radical of from about 8 to 30 carbon atoms, aqueous sodium hydroxide solution of from about 2 percent to about 10 percent sodium hydroxide concentration, and a sulfonyl chloride of the formula:

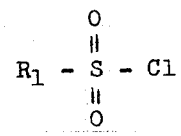

wherein R$_1$ is selected from the group consisting of alkyl, aromatic, and alkyl aromatic, in the presence of a hydrocarbon solvent boiling within the gasoline boiling range;
   b. reacting the mixture of step (a), at a temperature of from about 35°C. to about 75°C., below the boiling point of the hydrocarbon solvent, to form a reaction mixture containing the reaction products water, sodium chloride and a sulfonamide of the formula

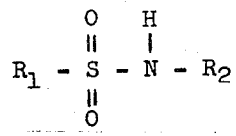

wherein R$_1$ is selected from the group consisting of alkyl, aromatic, and alkyl aromatic, and wherein R$_2$ is alkyl of from 8 to 30 carbon atoms;
   c. separating the reaction mixture of step (b) into a water phase and a hydrocarbon phase substantially free of water, wherein the hydrocarbon phase comprises from about 5 parts to about 50 parts hydrocarbon solvent and one part sulfonamide reaction product;
   d. dissolving, in a weight ratio of from about 1:1 to about 10:1 based on sulfonamide, an alkyl phenol solubilizing agent in said dry hydrocarbon phase to form a clear solution of alkyl phenol and sulfonamide in hydrocarbon solvent;
   e. separating any solid sodium chloride from the solution of step (d) by solid-liquid separation means; and
   f. recovering the clear solution of alkyl phenol and sulfonamide in hydrocarbon solvent for use as an alkylation aid in a strong acid catalyzed alkylation reaction.

2. The process of claim 1 wherein said primary alkyl amine and said sulfonyl chloride reactants are employed in about equi-molar amounts, wherein sodium hydroxide is employed in about 2 percent to about 5 percent molar excess, wherein the reaction of step (b)

is continued with mixing for a time of from several minutes to about 4 hours for essentially complete reaction of said alkyl amine and said sulfonyl chloride and wherein a major portion of unreacted sodium hydroxide and sodium chloride reaction product is present in the separated water phase of step (c).

3. The process of claim 2 wherein the hydrocarbon solvent is selected from the group consisting of alkyl, alkyl substituted cycloalkyl, polycyclo alkyl, paraffin, aromatic, and mixtures thereof having from about 6 to 10 carbon atoms and, wherein the alkyl phenol solution aid is selected from mono-and di-nuclear aromatics having at least one phenol hydroxy group and having at least one alkyl side chain of from about 6 to about 50 carbon atoms.

4. The process of claim 3 wherein the alkyl amine is octadecyl amine, wherein the sulfonyl chloride is selected from the group consisting of benzene sulfonyl chloride, toluene sulfonyl chloride and methane sulfonyl chloride, and wherein the sulfonamide reaction product is N-(octadecyl) benzene sulfonamide, N-(octadecyl) toluene sulfonamide or N-(octadecyl) methane sulfonamide in correspondence with the selected sulfonyl chloride.

5. A process for manufacturing a liquid solution useful as an alkylation aid comprising:
   a. combining, in a reaction zone, a primary alkyl amine having an alkyl radical of from about 8 to 30 carbon atoms, aqueous sodium hydroxide solution of from about 2 percent to about 10 percent sodium hydroxide concentration, and a sulfonyl chloride of the formula:

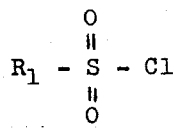

wherein $R_1$ is selected from the group consisting of alkyl having from 1 to 7 carbon atoms, benzene, and toluene, in the presence of a hydrocarbon solvent boiling within the gasoline boiling range;
   b. heating the mixture of step (a), for a period of from several minutes to about 4 hours, at a temperature of from about 40°C. to about 75°C. for reaction of alkyl amine, sulfonyl chloride and sodium hydroxide to form sodium chloride and a sulfonamide of the formula

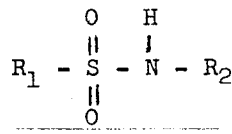

wherein $R_1$ is selected from the group consisting of alkyl of from 1 to 7 carbon atoms, benzene, and toluene, and wherein $R_2$ is alkyl of from about 8 to 30 carbon atoms;
   c. settling the reaction mixture of step (b), at a temperature of from about 40°C. to about 75°C., to form a water phase containing a major portion of the sodium chloride and a hydrocarbon phase containing reaction product sulfonamide, dissolved water and a minor portion of the sodium chloride;
   d. separating, by liquid-liquid separation means, the water phase from the hydrocarbon phase;
   e. dissolving into the separated hydrocarbon phase an alkyl phenol solution aid selected from the group consisting of mono-and di-nuclear aromatics having ate least one phenolic hydroxyl group and at least one alkyl side chain of from 6 to 50 carbon atoms in a weight ratio of alkyl phenol to sulfonamide of from about 1:1 to about 10:1;
   f. distilling, in a distillation zone, dispersed water from the hydrocarbon solution of sulfonamide and alkyl phenol;
   g. separating, by solid-liquid separataion means, solid sodium chloride from the dry hydrocarbon solution of step (f); and
   h. recovering the dry hydrocarbon solution of sulfonamide and alkyl phenol, free of solid sodium chloride, for use as an alkylation aid in a liquid strong acid catalyzed alkylation reaction.

6. The process of claim 5 wherein the alkyl radical of the primary alkyl amine is from about 10-18 carbon atoms, wherein the hydrocarbon solvent is selected from the group consisting of cycloaliphatic, alkyl substituted cycloaliphatic, polycycloaliphatic, paraffin, aromatic hydrocarbons of from 6 to 10 carbon atoms, and mixtures thereof, and wherein the alkyl phenol solution aid is selected from the group consisting of mononuclear, monohydroxy alkyl phenols having an alkyl side chain of from 9 to 15 carbon atoms.

7. The process of claim 6 wherein the recovered hydrocarbon solution comprises from about 40 percent to about 90 percent hydrocarbon solvent, and about 5 percent to about 15 percent product sulfonamide, and wherein the remainder of the recovered hydrocarbon solution is essentially alkyl phenol solution aid.

8. The process of claim 7 wherein the hydrocarbon solvent is selected from the group consisting of cyclohexane, methylcyclohexane, decalin, iso-octane, benzene, toluene, and mixtures thereof.

9. The process of claim 8 wherein the alkyl amine is octadecyl amine, and wherein the sulfonyl chloride is selected from the group consisting of methane sulfonyl chloride, benzene sulfonyl chloride and toluene sulfonyl chloride, and wherein the sulfonamide product is N-(octadecyl) methane sulfonamide, N-(octadecyl) benzene sulfonamide or N-(octadecyl) toluene sulfonamide in correspondence with the selected sulfonyl chloride.

* * * * *